(12) United States Patent
Hoeink et al.

(10) Patent No.: US 12,254,246 B2
(45) Date of Patent: Mar. 18, 2025

(54) GRAPHICAL USER INTERFACE FOR UNCERTAINTY ANALYSIS USING MINI-LANGUAGE SYNTAX

(71) Applicant: BAKER HUGHES OILFIELD OPERATIONS LLC, Houston, TX (US)

(72) Inventors: Tobias Hoeink, Houston, TX (US); David Lee Cotrell, Houston, TX (US); Raymond Pols, Houston, TX (US); Robert Thomas Rundle, Houston, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 204 days.

(21) Appl. No.: 16/737,090

(22) Filed: Jan. 8, 2020

(65) Prior Publication Data

US 2020/0233993 A1    Jul. 23, 2020

Related U.S. Application Data

(60) Provisional application No. 62/794,532, filed on Jan. 18, 2019.

(51) Int. Cl.
| | | |
|---|---|---|
| *G06F 30/20* | (2020.01) | |
| *G06F 3/04847* | (2022.01) | |
| *G06F 40/211* | (2020.01) | |
| *G06F 113/08* | (2020.01) | |

(52) U.S. Cl.
CPC .......... *G06F 30/20* (2020.01); *G06F 3/04847* (2013.01); *G06F 40/211* (2020.01); *G06F 2113/08* (2020.01)

(58) Field of Classification Search
None
See application file for complete search history.

(56) References Cited

U.S. PATENT DOCUMENTS

| | | | | |
|---|---|---|---|---|
| 7,536,363 | B1 * | 5/2009 | Rosenfeld | G09B 7/04 |
| | | | | 434/323 |
| 8,706,599 | B1 * | 4/2014 | Koenig | G06Q 40/06 |
| | | | | 705/36 R |
| 10,203,428 | B2 * | 2/2019 | Morton | E21B 49/008 |
| 10,867,303 | B1 * | 12/2020 | Manapat | G06Q 10/067 |
| 10,896,274 | B1 * | 1/2021 | Morency | G06F 30/3308 |
| 2004/0019506 | A1 * | 1/2004 | Struchtemeyer | G06Q 40/08 |
| | | | | 705/4 |
| 2005/0209912 | A1 * | 9/2005 | Veeningen | G06Q 10/10 |
| | | | | 705/7.12 |

(Continued)

*Primary Examiner* — Haimei Jiang
(74) *Attorney, Agent, or Firm* — Baker Hughes Company

(57) ABSTRACT

A table including a record can be displayed within a graphical user interface display space. The record can include an attribute. Data characterizing a user input can be received. The user input can specify an input parameter of an entry associated with the attribute of the record. A predefined syntactical rule set can be used to parse the user input. The parsing can include determining one or more simulation attributes associated with executing a simulation. The one or more simulation attributes can be provided. The result of the executed simulation can be processed. The result of the executed simulation can be displayed within a graphical user interface display space. Related apparatus, systems, techniques, and articles are also described.

15 Claims, 11 Drawing Sheets

(56) References Cited

U.S. PATENT DOCUMENTS

| | | | | |
|---|---|---|---|---|
| 2009/0012761 | A1* | 1/2009 | Bertrand | G06Q 40/08 706/11 |
| 2009/0177451 | A1 | 7/2009 | Heragu | G06F 30/20 716/136 |
| 2009/0292514 | A1* | 11/2009 | McKim | G09B 19/003 703/6 |
| 2010/0131253 | A1* | 5/2010 | Benayon | G06Q 10/04 703/6 |
| 2010/0161300 | A1* | 6/2010 | Yeten | E21B 43/00 703/10 |
| 2011/0219348 | A1* | 9/2011 | Liu | G06F 30/327 716/132 |
| 2014/0172382 | A1* | 6/2014 | Andrews | F17D 5/00 703/2 |
| 2014/0278316 | A1* | 9/2014 | Dusterhoft | E21B 43/25 703/10 |
| 2015/0120255 | A1* | 4/2015 | King | E21B 43/00 703/2 |
| 2016/0019906 | A1* | 1/2016 | Takahashi | G10L 21/0264 704/228 |
| 2016/0179999 | A1* | 6/2016 | Mitra | G06F 17/13 703/2 |
| 2016/0188769 | A1* | 6/2016 | Aylott | G06Q 50/06 703/6 |
| 2016/0312552 | A1* | 10/2016 | Early | E21B 41/00 |
| 2017/0177761 | A1* | 6/2017 | Early | E21B 41/0092 |
| 2018/0010429 | A1* | 1/2018 | Willberg | E21B 49/087 |
| 2018/0016895 | A1* | 1/2018 | Weng | G01V 1/306 |
| 2018/0226992 | A1* | 8/2018 | Panteleev | H03M 13/616 |
| 2018/0321421 | A1* | 11/2018 | Halabe | G01V 11/00 |
| 2019/0095556 | A1* | 3/2019 | Satoh | G16H 50/50 |
| 2019/0170899 | A1* | 6/2019 | Morton | E21B 49/008 |
| 2019/0370155 | A1* | 12/2019 | Nanjundappa | G06F 11/3608 |
| 2022/0129766 | A1* | 4/2022 | Potts | G06N 5/022 |

* cited by examiner

FIG. 5

GRAPHICAL USER INTERFACE FOR UNCERTAINTY ANALYSIS USING MINI-LANGUAGE SYNTAX

CROSS REFERENCE TO RELATED APPLICATIONS

This application claims the benefit of and priority under 35 U.S.C. § 119 to U.S. Provisional Patent Application Ser. No. 62/794,532, filed on Jan. 18, 2019 and entitled "GRAPHICAL USER INTERFACE OR UNCERTAINTY ANALYSIS USING MINI-LANGUAGE SYNTAX," the entirety of which is incorporated by reference.

BACKGROUND

Hydraulic fracturing is a technique that can be used to release petroleum, natural gas, and other hydrocarbon-based substances for extraction from underground reservoir rock formations. The technique can include drilling a well, or wellbore, into the rock formations. A treatment fluid can be pumped into the wellbore. Fractures can form in the rock formations as a result of the pumped treatment fluid. The fractures can allow for the release of trapped substances to be produced from these subterranean natural reservoirs.

Simulating hydraulic fracturing along a wellbore can include constructing a computer model. The computer model can include various attributes, such as number of wellbores, number of stages per wellbore, treatment schedules per stage, and/or the like. In some instances, the attributes can be represented in a tabular format and can be stored as an input file. Given an input file of the various attributes, hydraulic fractures in the wellbore can be simulated.

SUMMARY

In an aspect, a table including a record can be displayed within a graphical user interface display space. The record can include an attribute. Data characterizing a user input can be received. The user input can specify an input parameter of an entry associated with the attribute of the record. A predefined syntactical rule set can be used to parse the user input. The parsing can include determining one or more simulation attributes associated with executing a simulation. The one or more simulation attributes can be provided.

One or more of the following features can be included in any feasible combination. For example, one or more simulation input files corresponding to the one or more simulation attributes can be generated. The simulation can be executed using the one or more simulation input files. A result of the executed simulation can be provided. The result of the executed simulation can be processed. The result of the executed simulation can be displayed within a graphical user interface display space. A sensitivity analysis can be executed using the one or more simulation attributes. The parsing can be performed by a parsing server that can include memory and at least one data processor that can be configured to perform operations including the parsing.

A number of simulation variations can be determined using a number of the one or more simulation attributes. The number of simulation variations can be provided within the graphical user interface display space. The one or more simulation attributes can include discrete values, continuous values, or categorical values. The predefined syntactical rule set can include defining two values using a first predefined character to separate a first value from a second value; defining a range of values using a second predefined character to separate a start of the range from an end of the range; defining a distribution using a distribution name, a mean, a standard deviation, a minimum, and a maximum; defining a unit system; defining a value using scientific notation; defining the value using decimal notation; and/or combinations thereof.

The attribute can characterize a wellbore, a treatment schedule, a perforation zone, a rock property, a fluid loss, a slurry rate, a stage fluid volume, a stage time, a stage type, a fluid type, a proppant type, a proppant concentration, a proppant damage factor, a total time, a slurry volume, and/or combinations thereof. One or more simulation input parameters corresponding to the one or more simulation attributes can be generated. The simulation can be executed using the one or more simulation input parameters. A result of the executed simulation can be provided. A hydraulic fracturing plan can be selected using the result of the executed simulation. The hydraulic fracturing plan can be executed.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 5 is a diagram illustrating an example graphical user interface object that facilitates prescribing uncertainty;

DETAILED DESCRIPTION

Uncertainty can be present in the computer simulation of a hydraulic fracture surrounding the value of various attributes associated with the real world conditions represented in the computer model. To indicate that the value of an attribute can vary between more than one choice, for example, alternative choices, loops can be used in a computer programming language, such as Python, Matlab, C, Fortran, and/or the like. Alternatively, multiple, in some cases nested, forms in mouse driven, point-and-click user interfaces can be utilized. In some cases, neither of these techniques can allow for quick specification and simultaneous compact overview of choices relevant to a given simulation. Additionally, these techniques can be cumbersome and error-prone. In some instances, prescribing uncertainty in attributes can exponentially increase the number of simulations for a given computer model.

As such, it can be desirable to prescribe uncertainty in attributes used in hydraulic fracturing simulations. Some implementations of the current subject matter can facilitate prescribing uncertainty in hydraulic fracturing simulations. For example, utilizing the current subject matter, uncertainty can be prescribed in various entries using a predefined syntactical rule set, referred to as a mini-language. By using predefined syntactical rule sets, the current subject matter can facilitate rapid and/or user-friendly prescription of uncertainty to multiple entries, reduce errors in uncertainty prescription, and/or provide a compact overview of choices relevant to a given simulation.

Figure 1:
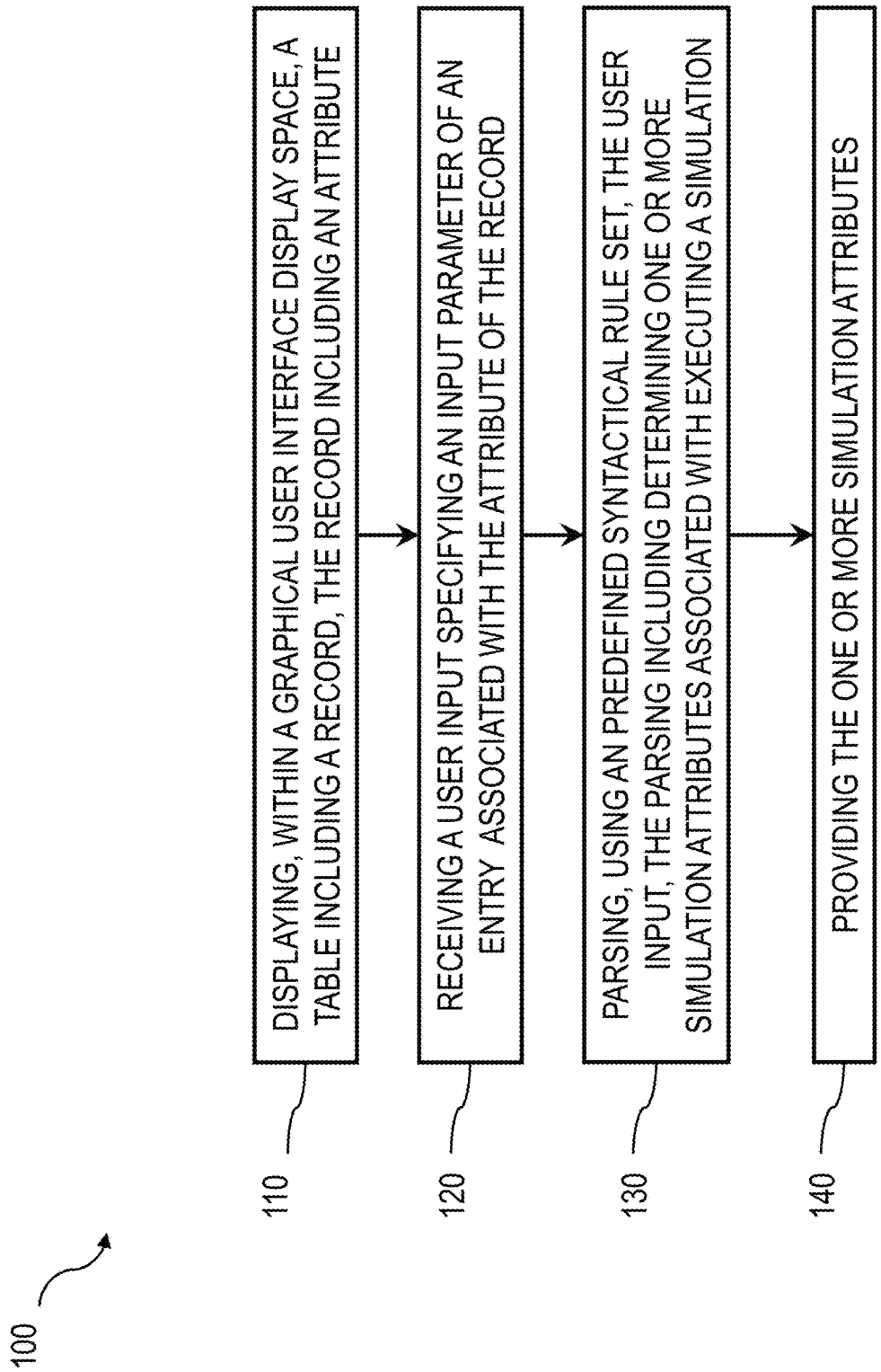
FIG. 1 is a process flow diagram illustrating an example process for prescribing uncertainty.

FIG. 1 is a process flow diagram illustrating an example process for prescribing uncertainty in a hydraulic fracture simulation environment. Using predefined syntactical rule sets can facilitate rapid and user-friendly prescription of uncertainty to multiple entries, reduce errors in uncertainty prescription, and provide a compact overview of choices relevant to a given simulation. For example, a table can represent various attributes utilized as inputs to the computer model for hydraulic fracture simulation. The table can include on or more records and each record can include one or more attributes. An entry can correspond to each attribute associated with a record. For example, records can correspond to rows in the table, attributes can correspond to columns in the table, and entries can correspond to cells in the table.

Figure 2:
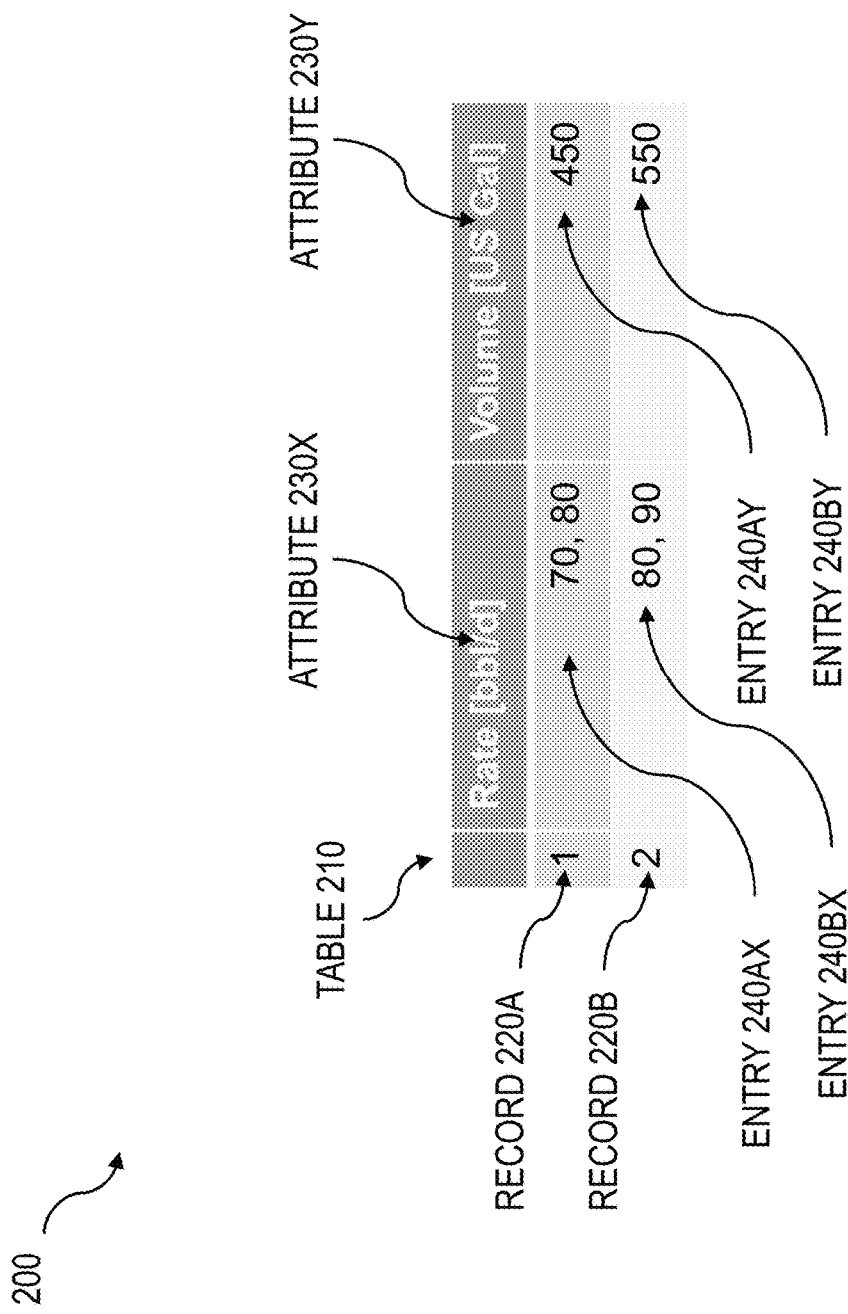
FIG. 2 is a diagram illustrating an example table facilitating prescribing uncertainty.
Figure 3:
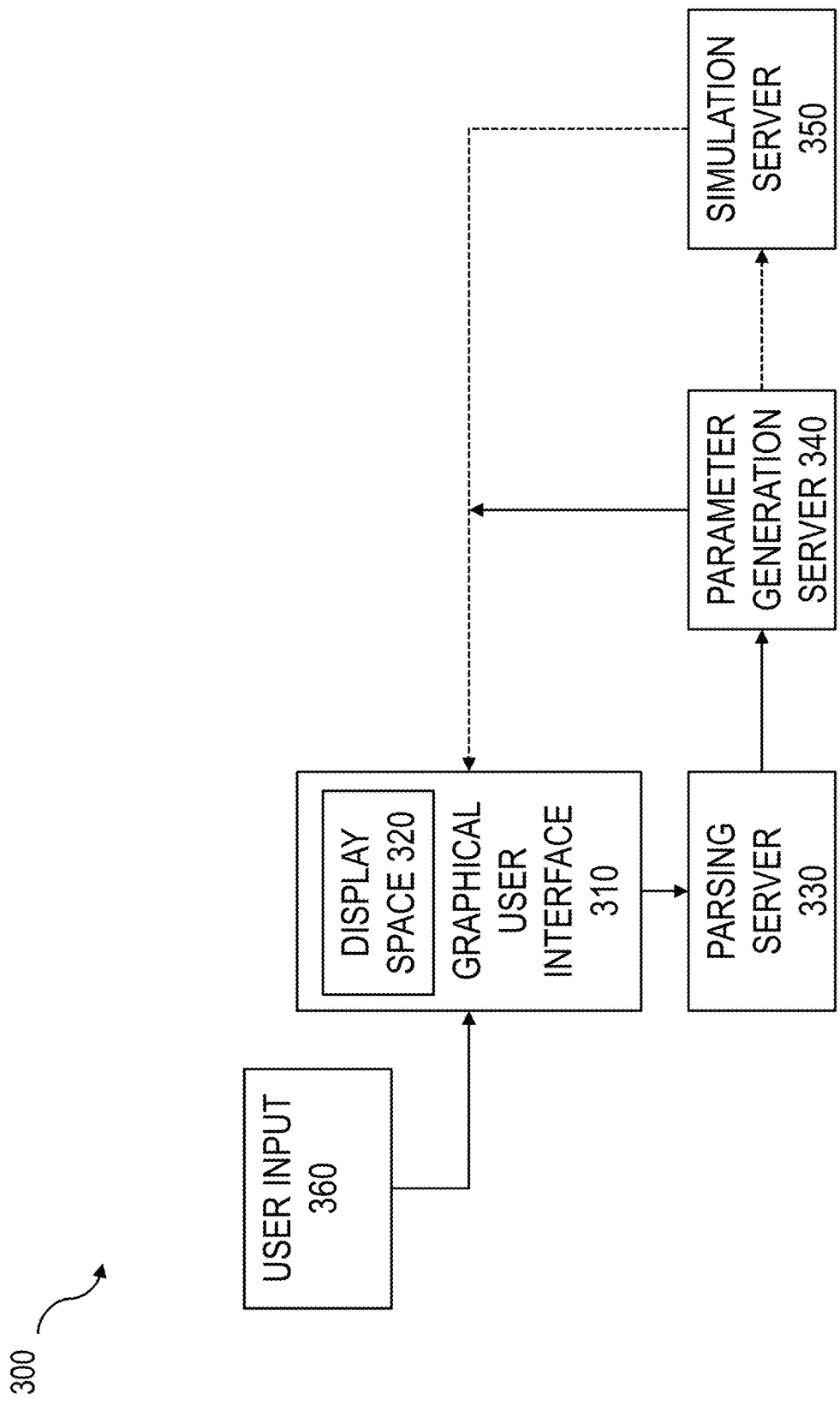
FIG. 3 is a system block diagram illustrating an example system that facilitates prescribing uncertainty.

At 110, a table can be displayed in a display space of a graphical user interface (GUI). With reference to FIG. 2, table 210 can include record 220, record 220 can include attribute 230, and each attribute 230 associated with record 220 can include an entry 240. For example, record 220A includes a value of 450 US Gal for entry 240AY associated with the volume attribute 230Y. With reference to FIG. 3, GUI 310 can include display space 320. Display space 320 can be configured to display a tabular representation of inputs to a hydraulic fracturing simulation. Additionally, display space 320 of GUI 310 can facilitate interaction with table 210.

At 120, a user input specifying an input parameter corresponding to an entry of the attribute associated with the record can be received. For example, a user can directly manipulate table 210 utilizing a visual indicator of entry 240BY associated with attribute 230Y of record 220B in display space 320 of GUI 330. A user can trigger entry 240 for editing. For example, entry 240BY can be clicked by the user. An indicator, such as a cursor, can display the current position for user interaction in entry 240BY represented on display space 320 of GUI 310. With reference to FIG. 3, the user can specify an input parameter as user input 360.

For example, user input 360 can specify an input parameter of entry 240BY associated with attribute 230Y of record 220B. User input 360 can use a predefined syntactical rule set prescribing uncertainty. For example, a user can indicate uncertainty in an entry by supplying two values for the entry. A predefined character (e.g., first predefined character, comma, semi-colon, colon, and/or the like) can separate the two values in an entry corresponding to an attribute associated with a given record. With a single value for an entry 240, such as the value 28, there can be no uncertainty as to the value of entry 240 when entry 240 is supplied as input into a simulation. The value of entry 240 can be 28. In order to represent uncertainty, a user can input to entry 240 according to a mini-language syntax. For example, a user can input values for entry 240 separated by a comma (e.g., 28, 29).

As another example of an input parameter, a user can indicate a range of values to prescribe uncertainty between values in a range of values. For example, a predefined character (e.g., second predefined character, double dot .., and/or the like) can separate a start value and an end value for an entry 240. For example, the user can indicate the desired range of values prescribing uncertainty between values in the range of values from 30 to 40 for entry 240 by separating the starting value of the range (e.g., 30) from the end value of the range (e.g., 40) separated by a double dot (e.g., 30 .. 40). This prescription of uncertainty can be received from the user input 360, and can specify an input parameter of entry 240 corresponding to attribute 230 associated with record 220.

FIG. 2 is a diagram including an example user input applying the comma predefined syntactical rule, where entry 230AX, corresponding to attribute 230X associated with record 220A, can prescribe uncertainty between the two distinct values 70 and 80. By using predefined syntactical rule sets including the comma and double dot predefined syntactical rules, some implementations of the current subject matter can facilitate rapid and user-friendly prescription of uncertainty to multiple entries, reduce errors in uncertainty prescription, and provide a compact overview of choices relevant to a given simulation. The comma can separate the two distinct values such that a prescription of uncertainty for entry 240 can indicate uncertainty between a value of 70 and a value 80.

Referring again to FIG. 1, at 130, the user input can be parsed using the predefined syntactical rule set. The parsing can include determining one or more simulation attributes associated with executing a simulation. For example, with reference to FIGS. 2 and 3, entry 240BX (e.g., 80, 90) can be received as user input 360. The user input can be parsed using the comma predefined syntactical rule. One or more simulation attributes can be determined. For example, using the comma predefined syntactical rule, the values 80 and 90 can be the determined simulation attributes. The simulation attributes determined from parsing user input (e.g., 80 and 90) can be associated with executing a simulation. For example, the prescribed uncertainty associated with the user input can correspond to uncertainty between selecting a simulation attribute value for executing a simulation (e.g., executing a simulation with a rate value of 80 or executing a simulation with a rate value of 90.)

Referring again to FIG. 1, at 140, the one or more simulation attributes can be provided. For example, the one or more simulation attributes can be provided in the tabular representation of the computer model. For example, the simulation attributes can be provided in display space 320 of GUI 310. With reference to FIG. 2, the simulation attributes can be provided in entry 240BX of table 210.

FIG. 3 is a system block diagram illustrating an example implementation of a system 300 for prescribing uncertainty. Using predefined syntactical rule sets, system 300 can facilitate rapid and user-friendly prescription of uncertainty to multiple entries, reduce errors in uncertainty prescription, and provide a compact overview of choices relevant to a given simulation. System 300 can include a display space of a graphical user interface (GUI), a parsing server, a parameter generation server, a simulation, and a user input.

Display space 320 of GUI 310 can be configured to display the tabular representation of the computer model. For example, table 210 can be displayed in display space 320 of GUI 310. GUI 310 can be configured to receive user input 360 from a user of system 300. The user input 360 can include an input parameter to an entry 240. The user can trigger entry 240 for editing (e.g., clicking entry 240 in display space 320 of GUI 310 to trigger entry 240 for editing) and indicate input parameters. For example, user input 360 can include input parameters indicating two values, such as 80 and 90 in entry 240BX. User input 360 can specify an input parameter of entry 240BX corresponding to attribute 230X associated with record 220B (e.g., 80, 90) following the comma predefined syntactical rule).

Parsing server 330 can be configured to receive user input 360 (e.g., 80, 90) from GUI 310. Parsing server 330 can be configured to parse the input parameters included in user input 360. Parsing the input parameters can include analyzing the input parameters into the logical syntactical components defined by the predefined syntactical rule set. For example, the predefined syntactical rule set can include a reference value, multiple values, a reference value including a range, a distribution, and a reference value including a distribution.

Figure 4:
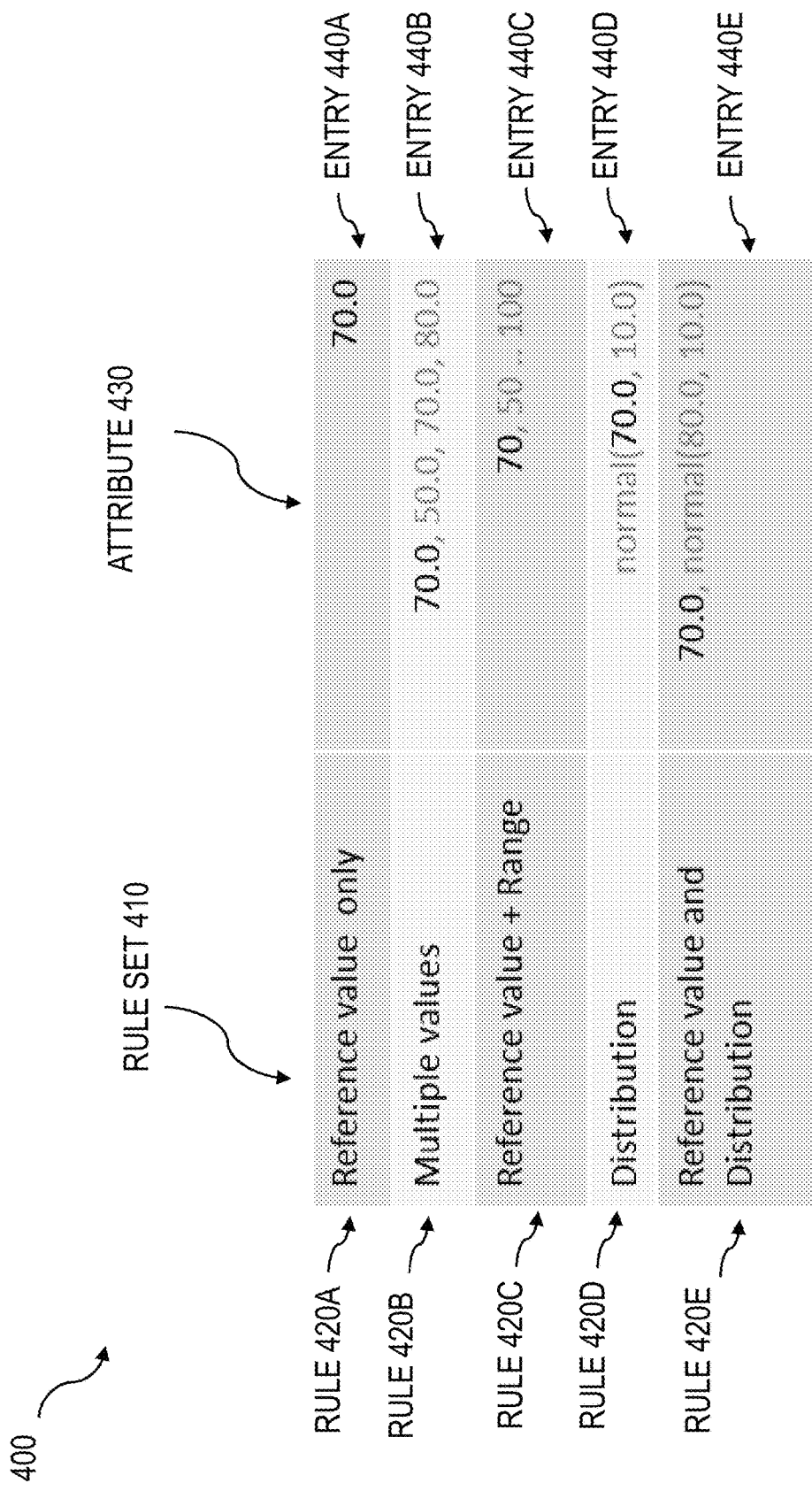
FIG. 4 is a diagram illustrating an example predefined syntactical rule set.

FIG. 4 is a diagram illustrating an example syntactical rule set, also referred to as a mini-syntax. By using predefined syntactical rule sets, the current subject matter can facilitate rapid and user-friendly prescription of uncertainty to multiple entries, reduce errors in uncertainty prescription, and provide a compact overview of choices relevant to a given simulation.

Rule 420A can define a logical syntactical component corresponding to a reference value. For example, entry 440A can illustrate the syntax defining a value 70.0. The value can represent a reference value for attribute 430. A reference value can prescribe certainty. For example, there can be certainty (e.g., no uncertainty) as to the value of entry 440A in a simulation, entry 440A can take the value 70.0. Rule 420B can prescribe uncertainty by defining logical syntactical components corresponding to multiple values. For example, entry 440B can illustrate the syntax defining multiple values 70.0, 50.0, 70.0, 80.0. Rule 420B can correspond to separating multiple values by a comma.

Rule 420C can define logical syntactical components corresponding to a reference value and a range of values. For example, entry 440C can illustrate the syntax defining a reference value 70.0 and a range of values 50 .. 100. A double dot (..) can separate a start value of a range of values (e.g., 50) from an end value of a range (e.g., 100). Also, a number of samples can be indicated to define a discrete range of values. Additionally, the range of values can correspond to a continuous range of values. For example, defining 6 samples can correspond to a range of discrete values 50.0, 60.0, 70.0, 80.0, 90.0, 100.0. Alternatively, a step size can be indicated to define a discrete range of values. For example, indicating a step size of 10 can correspond to a range of values 50.0, 60.0, 70.0, 80.0, 90.0, 100.0.

Rule 420D can define logical syntactical components corresponding to a distribution. For example, entry 440D can illustrate the syntax defining a normal distribution, with the first value as a mean (e.g., 70.0) and the second value as a standard deviation (e.g., 10.0). The distribution can be defined by a string including the name of the distribution (e.g., normal) and the associated parameters with the distribution (e.g., a mean and a standard deviation). Rule 420E can define logical syntactical components corresponding to a reference value and a distribution. For example, entry 440E can illustrate the syntax defining a reference value (e.g., 70.0) and a normal distribution with the first value as a mean (e.g., 80.0) and the second value as a standard deviation (e.g., 10.0).

In general, the predefined syntactical rule set can define discrete values, continuous values, categorical values, a minimum value of a range of values, and/or a maximum value of a range of values. Also, the predefined syntactical rule set can support discrete and continuous distributions, such as a normal distribution, an exponential distribution, a gamma distribution, and/or the like. Additionally, the predefined syntactical rule set can define units of measurement corresponding to values, ranges of values, and/or distributions. Furthermore, the predefined syntactical rule set can define numerical values corresponding to decimal and/or scientific notation.

With reference to FIG. 3, parameter generation server 340 can receive the parsed user input including the one or more determined simulation attributes associated with executing a simulation. Parameter generation server 340 can be configured to provide a number of simulations given a prescribed uncertainty. For example, with reference to FIG. 2, table 210 can result in four possible simulations.

For example, the first simulation can include a rate 70 from entry 240AX, a rate 80 from entry 240BX, a volume 450 from entry 240AY, and a volume 550 from entry 240BY. The second simulation can include a rate 80 from entry 240AX, a rate 80 from entry 240BX, a volume 450 from entry 240AY, and a volume 550 from entry 240BY. The third simulation can include a rate 70 from entry 240AX, a rate 90 from entry 240BX, a volume 450 from entry 240AY, and a volume 550 from entry 240BY. The fourth simulation can include a rate 80 from entry 240AX, a rate 90 from entry 240BX, a volume 450 from entry 240AY, and a volume 550 from entry 240BY.

Prescribing uncertainty in entry 240AX can result in two possible simulations and prescribing uncertainty in entry 240BX can result in an additional two possible simulations. Parameter generation server 340 can provide GUI 310 with an indication that there are four possible simulations that can result from prescribing uncertainty in entry 240AX and entry 240BX. Also, parameter generation server 340 can determine a total number of possible simulations resulting from prescribing uncertainty across an entire table 210. For example, parameter generation server 340 can determine a number of possible simulations resulting from prescribing uncertainty in each entry 240, and combine the resulting number of possible simulations from each entry 240 to determine a number of possible simulations from the combinations of entries 240 where uncertainty can be prescribed.

Parameter generation server 340 can provide (e.g., transmit) the number of possible simulations (e.g., the number of simulation variations) resulting from prescribing uncertainty in table 210 to simulation server 350. In some implementations, parameter generation server 350 can be configured to generate a simulation input file including one of several possible simulations for each possible simulation. Following the example above, parameter generation server 340 can generate four simulation input files (e.g., a first simulation input file including the values 70, 80, 450, 550; a second simulation input file including the values 80, 80, 450, 550; a third simulation input file including the values 70, 90, 450, 550; and a fourth simulation input file including the values 80, 90, 450, 550).

However, the number of possible simulations can increase exponentially with respect to the number of prescribed uncertainties. As such, parameter generation server 340 can provide an alternative representation of the simulation input files before generating the simulation input files. To reduce computational overhead associated with generating a large number of simulation input files for all possible simulations, parameter generation server 340 can selectively provide simulation input files. For example, parameter generation server 340 can generate simulation input files immediately preceding an execution of a simulation utilizing the generated simulation input files. For example, a user can indicate an order for generating simulation input files, such as a random order, where each simulation parameter can be selected at random from a prescribed uncertainty in entry 240. Alternatively, a user can indicate an order for generating simulation input files that can be based on a priority of simulation parameters, attributes 230, entries 240, reference values, ranges, distributions, predefined syntactical rule sets, and/or the like. Parameter generation server 340 can transmit the generated simulation input files to simulation server 350.

Simulation server 350 can receive simulation input files from parameter generation server 340. Simulation server 350 can be configured to execute a simulations given a simulation input file. For example, simulation server 350 can receive a simulation input file for table 210 including the values 80, 80, 450, 550. Simulation server 350 can execute a simulation on the received simulation input file. Simulation server 350 can provide the results of the executed simulation. For example, the results of the executed simulation can be provided to GUI 310. In some instances, simulation server 350 can process a result of the executed simulation. In some instances, simulation server 350 can execute a sensitivity analysis using the one or more simulation attributes and/or additional entries 240 of table 120.

Figure 5:
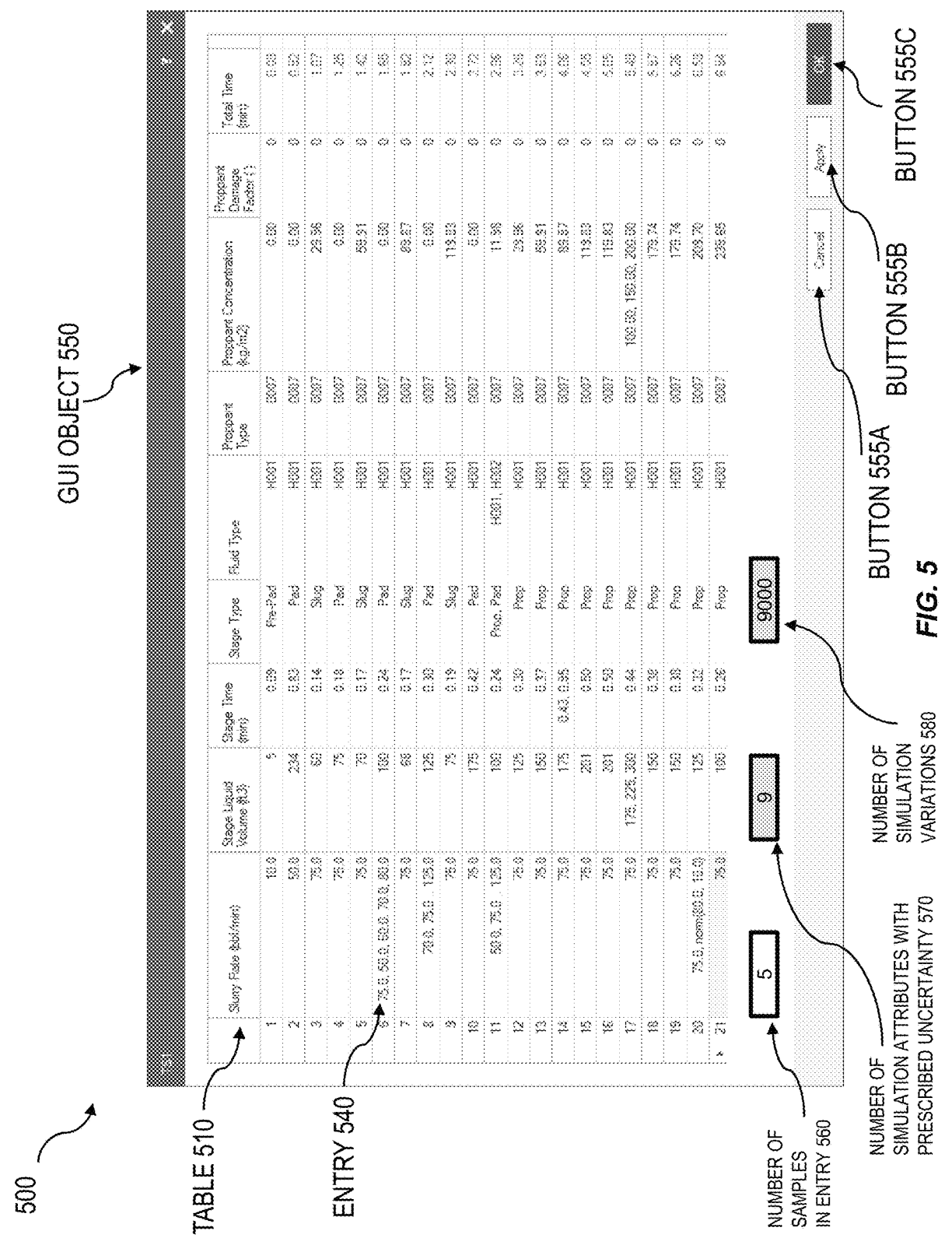

FIG. 5 is a diagram illustrating an example GUI object displaying a table in a display space of a GUI. By using predefined syntactical rule sets, the current subject matter can facilitate rapid and user-friendly prescription of uncertainty to multiple entries, reduce errors in uncertainty prescription, and provide a compact overview of choices relevant to a given simulation. GUI object 550 can present a visual representation of table 510 including entry 540. For example, entry 540 can include prescribed uncertainty between five values separated by a comma. Number of samples in entry 560 can indicate the number of possible simulations generated by the values in entry 540. Number of simulation attributes with prescribed uncertainty 570 can indicate the number of entries in table 510 that have been prescribed uncertainty. Number of simulation variations 580 can indicate the number of possible simulations resulting from the prescribed uncertainty across table 510. Button 555A-C can include GUI elements associated with interacting with GUI object 550, such as an action upon touch (e.g., on click). For example, interacting with button 555A can include canceling uncertainty prescription, and can close GUI object 550 (e.g., removing GUI element from display space 320 of GUI 310). Interacting with button 555B can include applying (e.g., storing, persisting, saving, and/or the like) the prescribed uncertainty and can allow GUI object 550 to display on display space 320 of GUI 320. Interacting with button 555C can include applying the prescribed uncertainty and can close GUI object 550.

Figure 6:
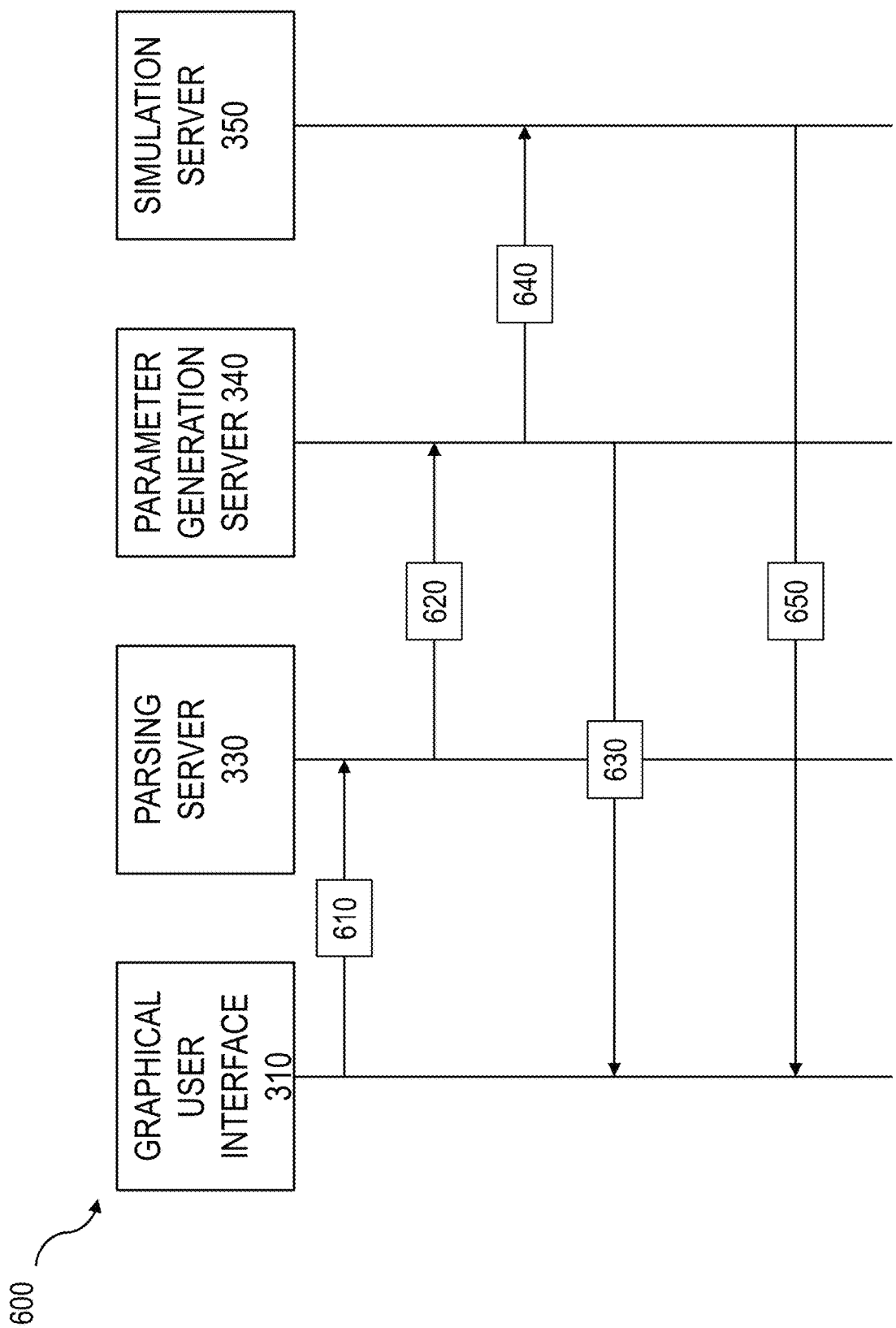
FIG. 6 is a data flow diagram illustrating an example data communication flow when prescribing uncertainty.

FIG. 6 is a data flow diagram illustrating data communication flow between an example implementation of the elements of FIG. 3 when prescribing uncertainty in entries of a table and executing simulations resulting from the prescribed simulations, for example, as illustrated in FIG. 1. By using predefined syntactical rule sets, the current subject matter can facilitate rapid and user-friendly prescription of uncertainty to multiple entries, reduce errors in uncertainty prescription, and provide a compact overview of choices relevant to a given simulation.

At 610, parsing server 330 can receive an input parameter of entry 240 associated with attribute 230 of record 220. The input parameter can be received by GUI 310 from user input 360 specifying the input parameter. For example, user input 360 can include 70.0, 80.0. Parsing server 330 can parse the received input parameter using a predefined syntactical rule set. For example, parsing server 330 can use the predefined syntactical rule indicating multiple values. Parsing server 330 can determine one or more simulation attributes associated with executing a simulation. For example, parsing server 330 can separate the input parameter into one or more simulation attributes corresponding to the logical syntactic components (e.g., 70 and 80).

At 620, parameter generation server 340 can receive the one or more simulation attributes. Parameter generation server 340 can determine the number of possible simulations resulting from prescribing uncertainty in entry 240 corresponding to attribute 230 associated with record 220 in table 210. Parameter generation server 340 can combine the resulting number of possible simulations from each entry 240 to determine a number of possible simulations from the combinations of entries 240 where uncertainty can be prescribed. The determined number of possible simulations can be transmitted to GUI 310. Parameter generation server 350 can generate a simulation input file including one of several simulation attributes for each possible simulation. The generated simulation input file can be transmitted to simulation server 350.

At 630, GUI 310 can receive the determined number of possible simulations resulting from prescribing uncertainty in entry 240 corresponding to attribute 230 associated with record 220 in table 210. GUI 310 can display the determined number of possible simulations (e.g., number of permutations of possible simulations resulting from selecting a single value from each entry with prescribed uncertainty) in display space 320 of GUI 310. For example, the number of samples in an entry 560, the number of simulation attributes with prescribed uncertainty 570, the determined number of simulation variations 580, and/or the like can be overlaid upon table 510 in GUI object 550.

At 640, simulation server 350 can receive one or more simulation input files. Each simulation input file can include one of several simulation attributes and/or additional entries 240 for each possible simulation. Simulation server 350 can execute a simulation using each received simulation input file. For example, simulation server 350 can execute a hydraulic fracturing simulation using a simulation input file corresponding to a set of simulation parameters parsed using a predefined syntactical rule set. Simulation server 350 can transmit the results of an executed simulation to GUI 310.

Additionally, simulation server 350 can transmit the results of an executed sensitivity analysis to GUI 310.

At 650, GUI 310 can receive the results of an executed simulation. Additionally, GUI 310 can receive the results of an executed sensitivity analysis. For example, GUI 350 can receive the results of the executed simulation after simulation server 350 executes a hydraulic fracturing simulation using a simulation input file corresponding to simulation parameters parsed using a predefined syntactical rule set. GUI 310 can display the results of the executed simulation on display space 320 of GUI 310. Additionally, GUI 310 can receive the results of an executed sensitivity analysis. For example, the executed sensitivity analysis can include an indication of how the uncertainty in an executed simulation can be attributed to prescribed uncertainty in different entries 240. GUI 310 can display the results of the executed sensitivity analysis in display space 320 of GUI 310.

Figure 7:
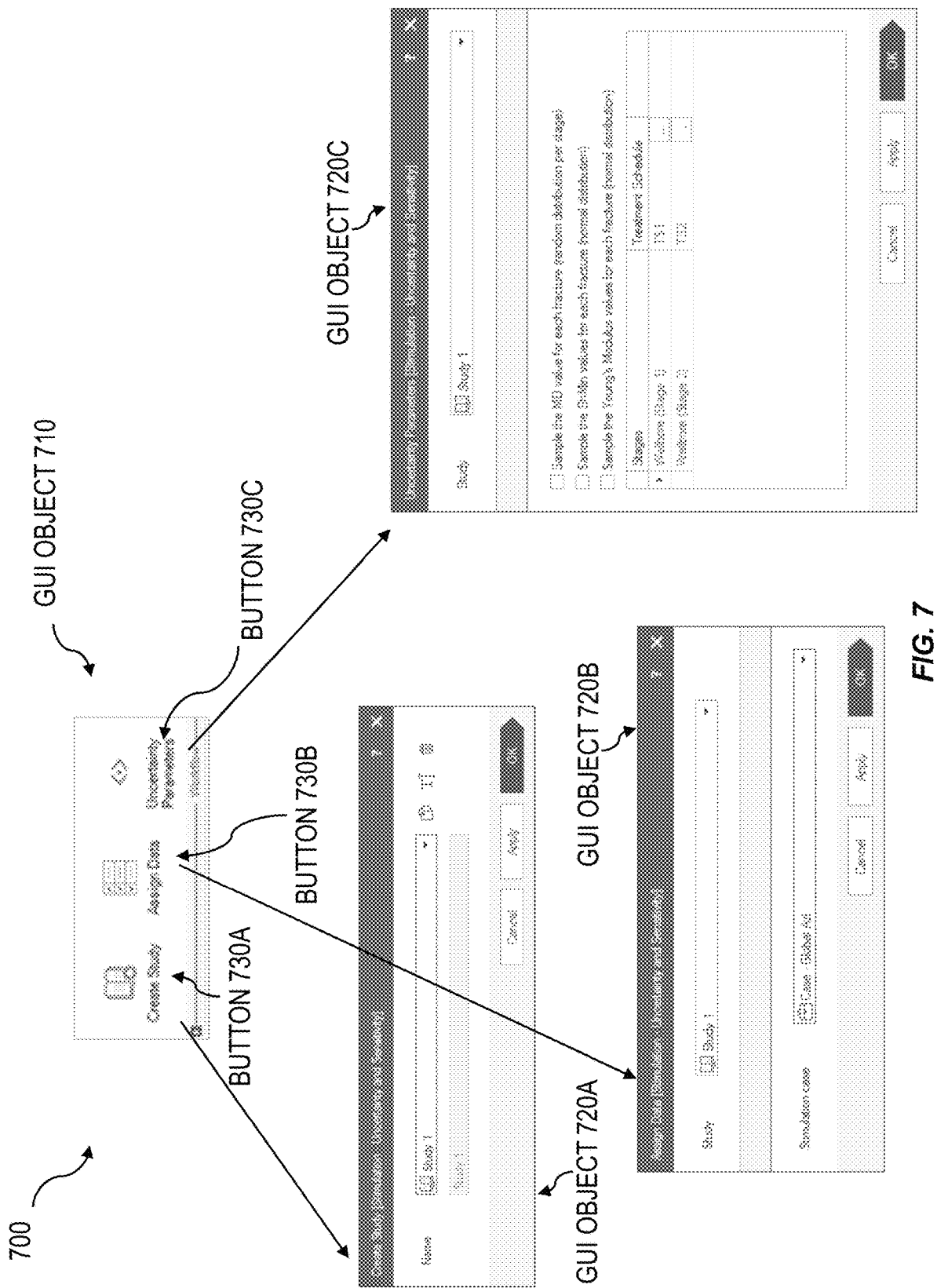
FIG. 7 is a diagram illustrating example graphical user interface objects including buttons.

FIG. 7 is a diagram illustrating example graphical user interface objects facilitating creating a study, assigning data, and setting uncertainty parameters. GUI object 710 can include buttons 730A-C. Button 730A can correspond to opening a GUI object 720A associated with creating a study, such as an uncertainty or sensitivity study. Button 730B can correspond to opening a GUI object 720B associated with assigning data, such as table 210 to the created study. Button 730C can correspond to opening a GUI object 720C associated with setting uncertainty parameters utilizing, for example, a predefined syntactical rule set.

Figure 8:
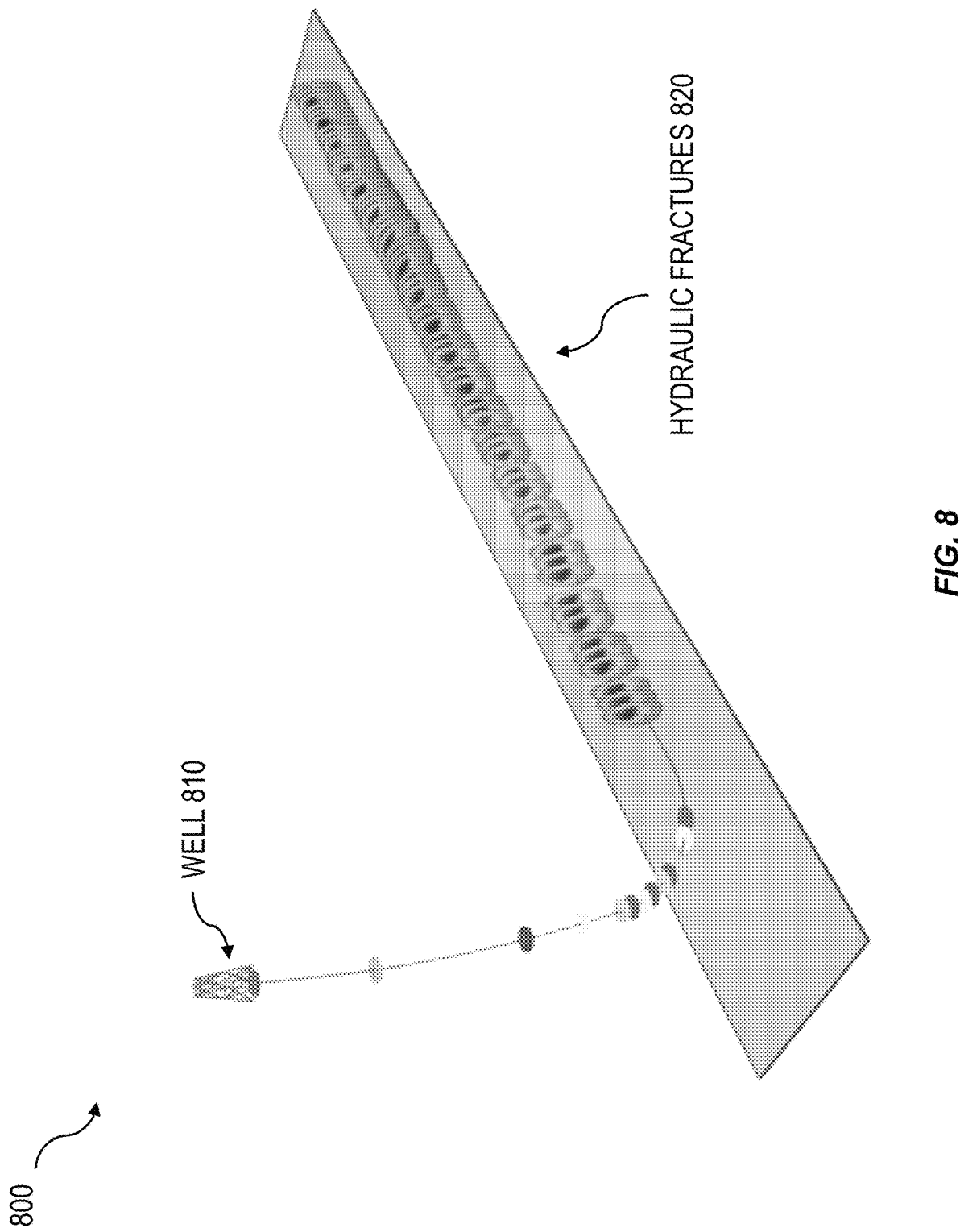
FIG. 8 is a diagram illustrating an example result of a hydraulic fracturing simulation.

FIG. 8 is a diagram illustrating an example result of an executed hydraulic fracturing simulation. A hydraulic fracturing model can include a well 810 and can be represented in table 210, and can include entries 240 corresponding to attributes 230 associated with records 220. For example, attributes 230 of a hydraulic fracturing simulation can characterize a wellbore, a treatment schedule, a perforation zone, a rock property, a fluid loss, a slurry rate, a stage fluid volume, a stage time, a stage type, a fluid type, a proppant type, a proppant concentration, a proppant damage factor, a total time, a slurry volume, combinations thereof and/or the like. Entries 240 can include input parameters prescribing uncertainty. The input parameters can be parsed using a predefined syntactical rule set and one or more simulation attributes associated with executing the hydraulic fracturing simulation can be determined. Simulation input files corresponding to simulation attributes can be generated. The hydraulic fracturing simulation can be executed on the simulation input files. The result of the hydraulic fracturing simulation can include a visual representation of well 810 and the resulting hydraulic fractures 820.

Figure 9:
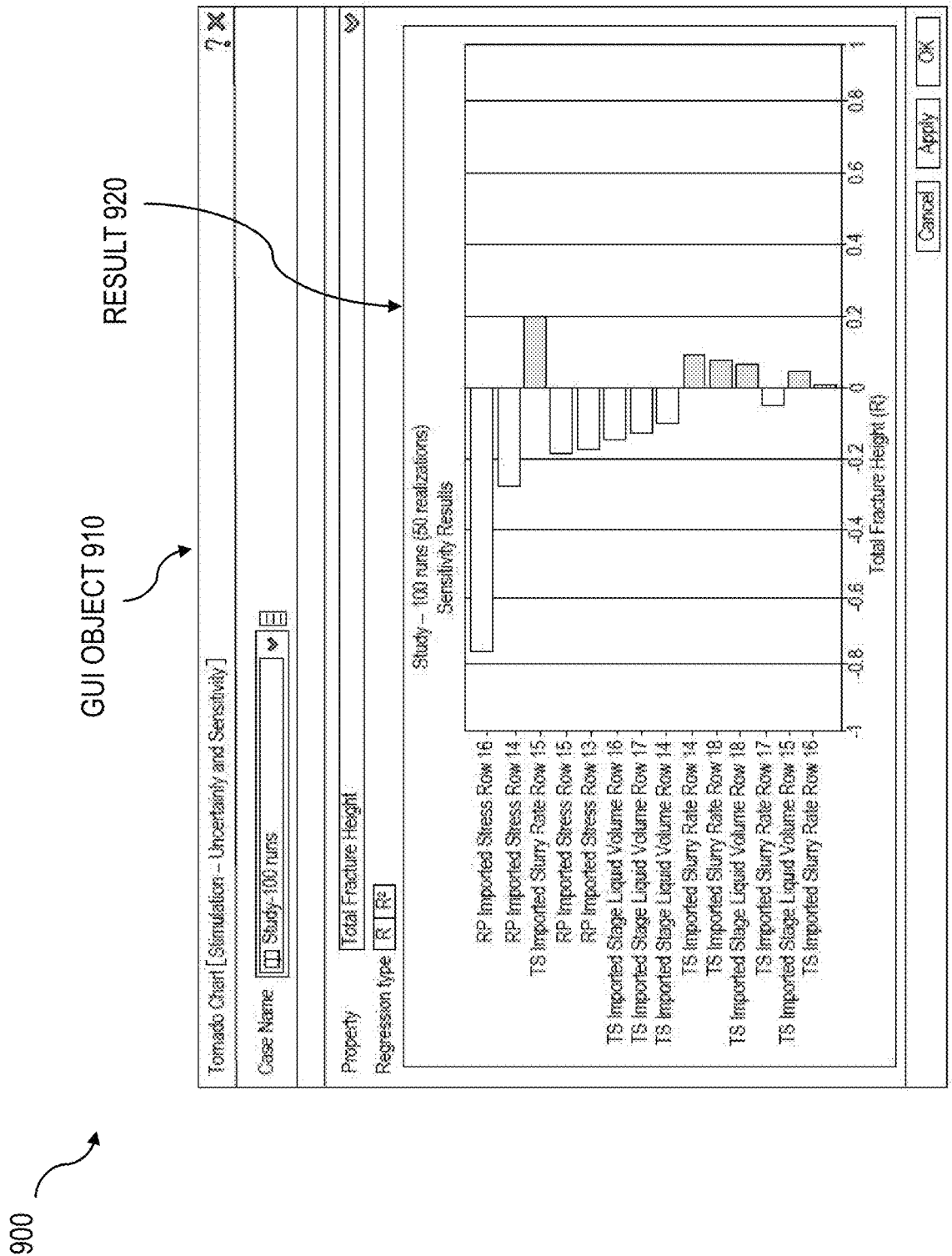
FIG. 9-11 are diagrams illustrating example graphical user interface objects including the results of a simulation.
Figure 10:
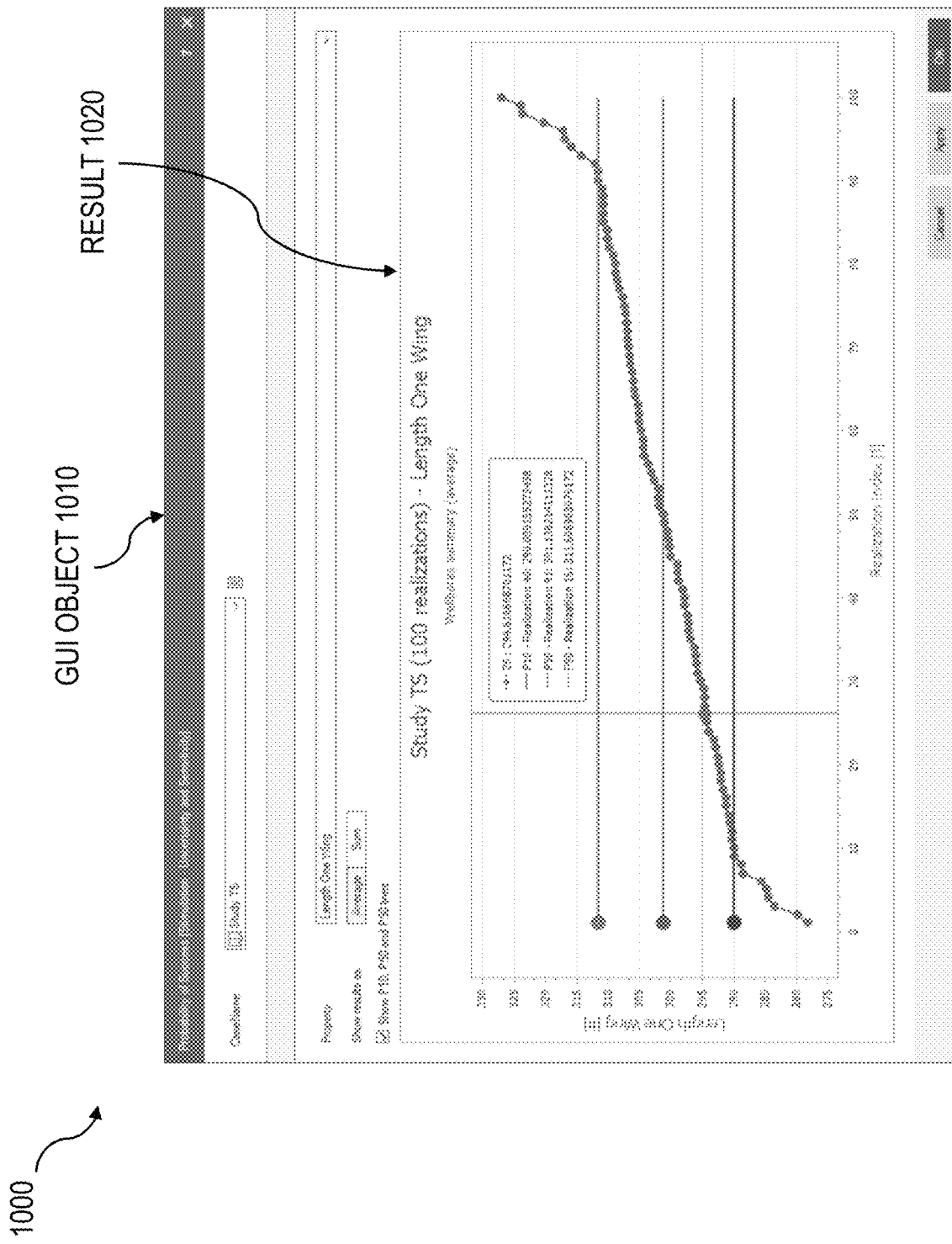
Figure 11:
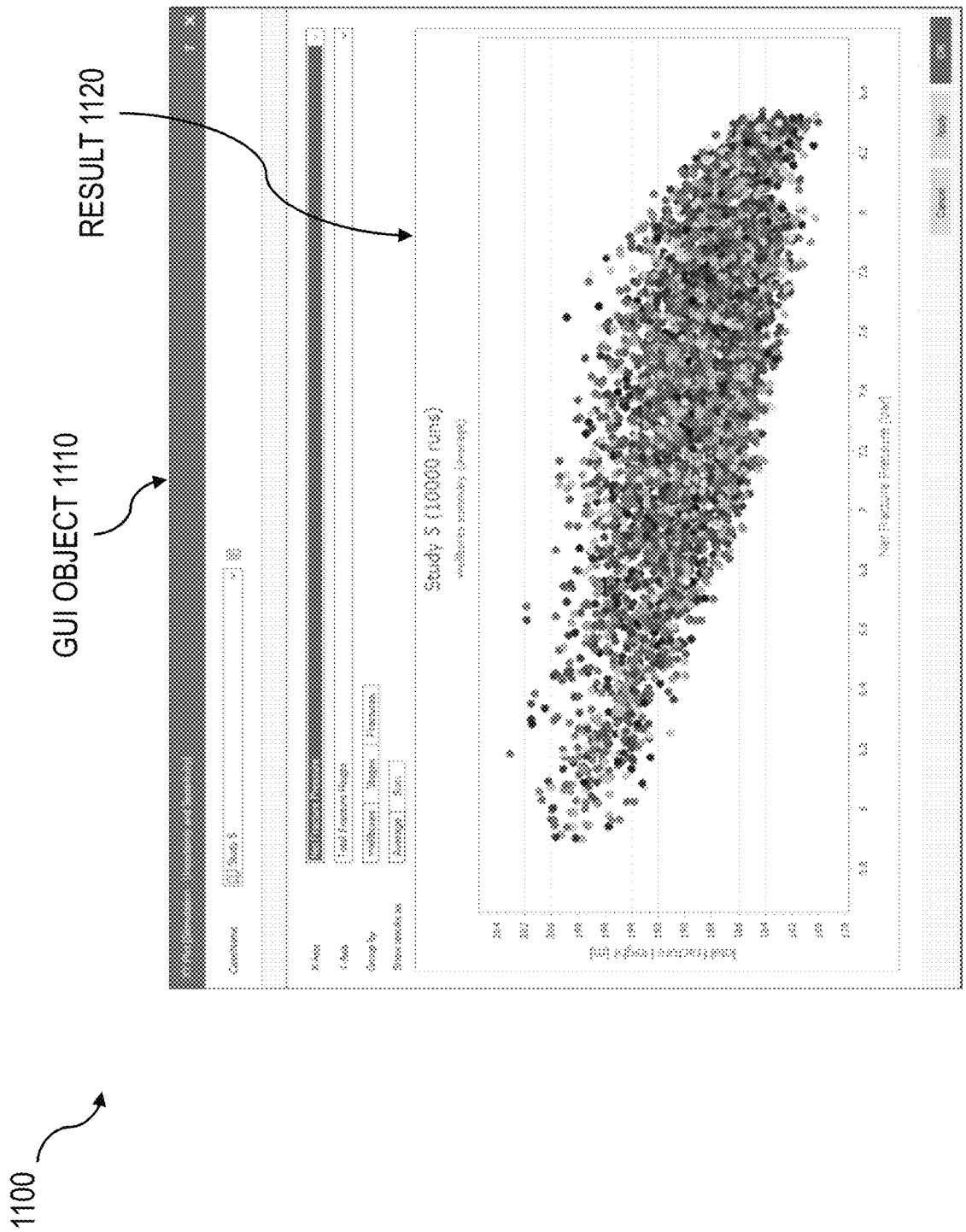

FIG. 9-11 are diagrams illustrating example graphical user interface objects facilitating providing the results of hydraulic fracturing simulations. With reference to FIG. 9, GUI object 910 can include result 920. Result 920 can include a tornado chart (e.g., tornado plot) illustrating the result of an uncertainty and/or sensitivity analysis. With reference to FIG. 10, GUI object 1010 can include result 1020. Result 1020 can include a probability of success chart illustrating the result of an uncertainty and/or sensitivity analysis. With reference to FIG. 11, GUI object 1110 can include result 1120. Result 1120 can include a scatter plot illustrating the result of an uncertainty and/or sensitivity analysis.

In some instances, a hydraulic fracturing plan can be selected using the result of the executed simulation (e.g., uncertainty and/or sensitivity analysis). For example, the hydraulic fracturing plan can include determining attribute values, such as a wellbore, a treatment schedule, a perforation zone, a rock property, a fluid loss, a slurry rate, a stage fluid volume, a stage time, a stage type, a fluid type, a proppant type, a proppant concentration, a proppant damage factor, a total time, a slurry volume, and/or combinations thereof. The hydraulic fracturing plan can be executed. For example, the hydraulic fracturing plan can be executed when performing hydraulic fracturing to release petroleum, natural gas, and/or other hydrocarbon-based substances for extraction from underground reservoir rock formations.

Although a few variations have been described in detail above, other modifications or additions are possible. For example, functions other than distributions can be invoked to define a set of values to distributions, lists, ranges, and/or the like. For example, trigonometric functions, exponential functions, user-defined functions, combinations thereof, and/or the like can be within the scope of the predefined syntactical rule sets. Some implementations can include key-value pair definitions (e.g., (key: value)), such as dictionary type look up inputs. For example, a distinct set of keys can be mapped to a set of values (e.g., (first key: first value, second key: second value, and/or the like)). Some implementations can include mathematical operations, such as addition (e.g., first value+second value), multiplication (e.g., first value*second value, first value×second value, and/or the like), power (e.g., first value^second value), combinations thereof, and/or the like. Some implementations can include entry dependence on other entries. For example, dependence on an entry can be indicated by a predefined symbol and a reference to the entry (e.g., $ reference). If an entry has a value (e.g., an input parameter with a value p1), a representation of double the value of a reference entry (e.g., a reference entry with a value p2) can be contemplated by some implementations of the current subject matter (e.g., the value of the input parameter with a value p1=2×p2, where x can indicate a predefined syntax for the multiplication operation). This can facilitate maintaining dependencies throughout a table. Iterative entries in the table can be made quicker and can include less risk of introducing human error.

The subject matter described herein provides many technical advantages. For example, the current subject matter can facilitate rapid and user-friendly prescription of uncertainty to multiple entries, reduce input errors in uncertainty prescription, and provide a compact overview of choices relevant to a given simulation.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   displaying, within a graphical user interface display space provided in a display of a computing device, a table associated with a hydraulic fracture simulation of a wellbore of a well, the table including one or more records, each record including one or more attributes;
   receiving, by a data processor of the computing device, data characterizing a user input specifying an input parameter of an entry associated with the one or more attributes of the one or more records;
   parsing, by the data processor, the user input for each attribute of the one or more attributes into one or more simulation attributes associated with executing the hydraulic fracture simulation, the one or more simulation attributes parsed using a predefined mini language syntax including at least one syntactic rule defining a reference value indicative of a measure of uncertainty for each attribute of the one or more attributes;
   determining, by the data processor, prior to executing the hydraulic fracture simulation, a simulation variation value corresponding to a number of simulation variations associated with executing the hydraulic fracture simulation based on the measure of uncertainty for the one or more simulation attributes;
   displaying, within the table displayed in the graphical user interface display space, the simulation variation value; and
   determining, by the user, to apply the measure of uncertainty based on the simulation variation value resulting from the measure of uncertainty for the attribute.

2. The method of claim 1, further comprising:
   generating, by the data processor, one or more simulation input files corresponding to the one or more simulation attributes;
   executing, by the data processor, using the one or more simulation input files, the hydraulic fracture simulation; and
   displaying within the graphical user interface display space, a result of the executed hydraulic fracture simulation, the result including one or more hydraulic fracture plans.

3. The method of claim 2, further comprising:
   selecting, by the user, a hydraulic fracture plan of the one or more hydraulic fracture plans; and
   providing, by the data processor, the selected hydraulic fracture plan.

4. The method of claim 3, wherein providing the result of the executed hydraulic fracture simulation includes providing a visual representation of the well and a plurality of hydraulic fractures with respect to the well within the graphical user interface display space.

5. The method of claim 1, wherein the parsing is performed by a parsing server including memory and at least one second data processor coupled to the data processor of the computing device, the parsing server configured to perform operations including the parsing.

6. The method of claim 1, wherein the one or more simulation attributes include discrete values, continuous values, or categorical values.

7. The method of claim 1, wherein the predefined mini language syntax includes a plurality of syntactic rules defining two values using a first predefined character to separate a first value from a second value; a range of values using a second predefined character to separate a start of the range from an end of the range; a distribution using a distribution name, a mean, a standard deviation, a minimum, and a maximum; a unit system; a value using scientific notation; the value using decimal notation, or combinations thereof.

8. The method of claim 1, wherein the attribute characterizes a wellbore, a treatment schedule, a perforation zone, a fluid loss, a slurry rate, a stage fluid volume, a stage time, a stage type, a fluid type, a proppant type, a proppant concentration, a proppant damage factor, a total time, a slurry volume, and/or combinations thereof.

9. The method of claim 1, further comprising:
generating one or more simulation input parameters corresponding to the one or more simulation attributes;
executing, using the one or more simulation input parameters, the hydraulic fracture simulation; and
displaying within the graphical user interface display space, a result of the executed hydraulic fracture simulation, the result including one or more hydraulic fracture plans.

10. A system comprising:
a display;
at least one data processor;
a memory storing machine-readable, executable instructions which, when executed by the at least one data processor, causes the at least one data processor to perform operations comprising
displaying, within a graphical user interface display space of the display, a table associated with a hydraulic fracture simulation of a wellbore of a well, the table including one or more records, each record including one or more attributes;
receiving data characterizing a user input specifying an input parameter of an entry associated with the one or more attributes of the one or more records;
parsing the user input for each attribute of the one or more attributes into one or more simulation attributes associated with executing the hydraulic fracture simulation, the one or more simulation attributes parsed using a predefined mini language syntax including at least one syntactic rule defining a reference value indicative of a measure of uncertainty for each attribute of the one or more attributes;
determining, prior to executing the hydraulic fracture simulation, a simulation variation value corresponding to number of simulation variations associated with executing the hydraulic fracture simulation based on the measure of uncertainty for the one or more simulation attributes;
displaying, within the table displayed in the graphical user interface display space, the simulation variation value; and
receiving data characterizing a user input specifying to apply the measure of uncertainty based on the simulation variation value resulting from the measure of uncertainty for the attribute.

11. The system of claim 10, wherein the operations performed by the at least one data processor further include:
generating one or more simulation input files corresponding to the one or more simulation attributes;
executing, using the one or more simulation input files, the hydraulic fracture simulation; and
displaying within the graphical user interface display space, a result of the executed hydraulic fracture simulation, the result including one or more hydraulic fracture plans.

12. The system of claim 11, wherein the operations performed by the at least one data processor further include:
selecting, by the user, a hydraulic fracture plan of the one or more hydraulic fracture plans; and
providing the selected hydraulic fracture plan.

13. The system of claim 12, wherein providing the result of the executed hydraulic fracture simulation includes providing a visual representation of the well and a plurality of hydraulic fractures with respect to the well within the graphical user interface display space.

14. The system of claim 10, wherein the parsing is performed by a parsing server including memory and at least one second data processor coupled to the at least one data processor, the first parsing server configured to perform operations including the parsing.

15. A non-transitory machine-readable medium storing executable instructions, which when executed by at least one data processor of at least one computing system including a display, cause the at least one data processor to perform operations comprising:
displaying, within a graphical user interface display space provided in the display, a table associated with a hydraulic fracture simulation of a wellbore of a well, the table including one or more records, each record including one or more attributes;
receiving data characterizing a user input specifying an input parameter of an entry associated with the one or more attributes of the one or more records;
parsing the user input for each attribute of the one or more attributes into one or more simulation attributes associated with executing the hydraulic fracture simulation, the one or more simulation attributes parsed using a predefined mini language syntax including at least one syntactic rule defining a reference value indicative of a measure of uncertainty for each attribute of the one or more attributes;
determining, prior to executing the hydraulic fracture simulation, a simulation variation value corresponding to a number of simulation variations associated with executing the hydraulic fracture simulation based on the measure of uncertainty for the one or more simulation attributes;
displaying, within the table displayed in the graphical user interface display space, the simulation variation value; and
receiving data characterizing a user input specifying to apply the measure of uncertainty based on the simulation variation value resulting from the measure of uncertainty for the attribute.

\* \* \* \* \*